United States Patent
Viggers (10) Patent No.: US 8,483,904 B2
(45) Date of Patent: Jul. 9, 2013

(54) DRIVABILITY EVALUATION TARGET LEVELS

(75) Inventor: John Stephen Viggers, Redondo Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 27 days.

(21) Appl. No.: 13/242,751

(22) Filed: Sep. 23, 2011

(65) Prior Publication Data

US 2013/0079989 A1 Mar. 28, 2013

(51) Int. Cl.
*G01M 17/00* (2006.01)
*G07C 5/08* (2006.01)
*G01M 17/007* (2006.01)

(52) U.S. Cl.
CPC ............. *G07C 5/0808* (2013.01); *G07C 5/085* (2013.01); *G01M 17/007* (2013.01); *B60R 2300/8006* (2013.01)
USPC ......................................... 701/33.4; 348/148

(58) Field of Classification Search
CPC ...... G07C 5/085; G07C 5/0891; G07C 5/0808; B60W 50/14; G09B 9/052; G01M 17/007; B60R 2300/8006
USPC ........................... 701/29.1, 41, 33.4; 348/148
See application file for complete search history.

(56) References Cited

U.S. PATENT DOCUMENTS

| | | | |
|---|---|---|---|
| 3,310,662 A | 3/1967 | Greenshields | |
| 5,805,079 A | 9/1998 | Lemelson | |
| 5,832,400 A | 11/1998 | Takahashi et al. | |
| 5,892,434 A | 4/1999 | Carlson et al. | |
| 6,092,014 A | 7/2000 | Okada | |
| 6,098,048 A | 8/2000 | Dashefsky et al. | |
| 6,593,848 B1 | 7/2003 | Atkins, III | |
| 6,879,969 B2 | 4/2005 | Engström et al. | |
| 7,023,333 B2 * | 4/2006 | Blanco et al. | 340/441 |
| 7,254,482 B2 | 8/2007 | Kawasaki et al. | |
| 7,389,178 B2 | 6/2008 | Raz et al. | |
| 7,676,306 B2 | 3/2010 | Kubo et al. | |
| 7,765,058 B2 | 7/2010 | Doering | |
| 8,010,286 B2 * | 8/2011 | Templeton et al. | 701/412 |
| 8,208,792 B2 * | 6/2012 | Morioka et al. | 386/248 |
| 8,244,309 B2 * | 8/2012 | Marumoto | 455/569.2 |
| 2002/0124260 A1 * | 9/2002 | Rivera | 725/105 |
| 2009/0070037 A1 * | 3/2009 | Templeton et al. | 701/213 |
| 2009/0318121 A1 * | 12/2009 | Marumoto | 455/414.1 |
| 2010/0085430 A1 * | 4/2010 | Kreiner et al. | 348/143 |
| 2010/0238289 A1 | 9/2010 | Wu | |
| 2011/0095879 A1 | 4/2011 | Heracles et al. | |

OTHER PUBLICATIONS

Walker et al.; "An On-Road Investigation of Vehicle Feedback and Its Role in Driver Cognition: Implications for Cognitive Ergonomics"; International Journal of Cognitive Ergonomics; V. 5, I. 5, pp. 421-444; 2001.
Pecheux et al.; "Automobile Drivers' Perceptions of Service Quality on Urban Streets"; Transportation Research Record: Journal of the Transportation Research Board of the National Academies; V. 1883; pp. 167-175; 2004.
Bezet et al.; "A System for Driver Behavioral Indicators Processing and Archiving"; 2006 IEEE Intelligent Transportation Systems Conference; pp. 799-804; Sep. 17, 2006.

* cited by examiner

*Primary Examiner* — James Trammel
*Assistant Examiner* — Todd Melton
(74) *Attorney, Agent, or Firm* — Snell & Wilmer LLP (57) ABSTRACT

The automobile described herein is configured with a system for capturing subjective and objective data related to automobile performance events. The automobile may comprise or be configured with a drivability evaluation system. This drivability evaluation system may be configured to capture subjective driver responses, monitor driver commands, and monitor automobile performance based on the driver commands. Moreover, the system may be employed in real world driving scenarios, where a driver's commands and the associated automobile responses are indicative of actual every day driving.

20 Claims, 6 Drawing Sheets

DRIVABILITY EVALUATION TARGET LEVELS

BACKGROUND

1. Field

The present invention relates to a system and method for establishing drivability target levels based on correlated subjective and objective data.

2. Description of the Related Art

In the past, automobile drivability has been largely subjective. A driver would be allowed to drive an automobile and then be asked by an evaluator about how the automobile performed. For example, when asked about acceleration, a driver may describe an automobile's acceleration performance as hard, smooth, or sluggish. When asked about braking, a driver may describe an automobile's braking performance as hard, grabby, or soft. These subjective descriptions of various performance parameters were helpful to automobile designers and engineers. However, these descriptions were not correlated to actual performance parameters or driver inputs, making it difficult for automobile designers and engineers to refine automobile performance parameters and driver inputs based on the subjective feedback.

The automobile may also be separately evaluated to determine or quantify certain performance characteristics. For example, acceleration of an automobile may be evaluated based on the time it takes the automobile to reach 60 miles per hour ("mph"). However, these tests to quantify certain automobile performance characteristics were not necessarily indicative of an automobile's performance in real world driving conditions. Moreover, these tests are typically performed by a trained driver and were not designed to correlate with performance parameters experienced by a typical driver in real world driving conditions.

Thus, there is a need for systems and methods that establish drivability evaluation target levels and that are configured to correlate a driver's subjective evaluation of an automobile's performance with driver commands and resulting automobile responses.

SUMMARY

In various exemplary embodiments, an automobile comprises a plurality of automobile controls, an engine, a plurality of wheels, a body, a control unit, a first data collection unit, and a second data collection unit. The automobile controls include, for example, a steering mechanism, an accelerator and a brake. In these embodiments, the driver of the automobile provides commands to the automobile controls to operate the automobile. The engine is operatively coupled to the plurality of driver inputs. The wheels are operatively coupled to the steering mechanism and the engine, such that, the engine drives at least one of the plurality of wheels. The body is configured to at least partially enclose the engine. The control unit is in communication with the engine and the plurality of automobile controls. In this way, the control unit is configured to manage the operation of the automobile, and more specifically, the operation of the engine based on driver commands. The first data collection unit is configured to monitor and record first data from the control unit. The second data collection unit is configured to monitor and record second data indicative of the operational parameters of the automobile and at least a portion of the first data from the control unit.

In various embodiments, this first data includes data corresponding to the first automobile control. The second data includes data corresponding to a first operational characteristic of the automobile and the data corresponding to the first automobile control. Moreover, the first data and the second data are combined based on the data corresponding to the first automobile control such that, the first data and the second data are correlated. In these embodiments, the first automobile control parameter may be acceleration, braking, steering, or any other suitable driver input.

In various embodiments, the automobile may further comprise a subjective driver monitoring device. The subjective driver monitoring device is configured to record a subjective response of the driver in response to an input to the driver input. In these embodiments and as noted above, the automobile controls is an input at the accelerator, brake pedal, steering wheel, or any other suitable input. Moreover, the subjective driver monitoring device records data during an entire automobile evaluation. The subjective driver monitoring device may be configured to monitor and/or capture subjective driver data during a driving test conducted by the driver over a predetermined course.

In exemplary embodiments, the subjective driver data is correlated to the first data and the second data. Further, the subjective driver data, the first data and the second data each comprise common data that is correlated with the subjective driver data, the first data and the second data. This common data provides a baseline for analysis of each of the subjective driver data, the first data and the second data.

In exemplary embodiments, a driver response information collection system comprises a first data collection unit, a second data collection unit and a subjective monitoring device. The first data collection unit is configured to collect first data indicative of a first driver command, second data indicative of a second driver command, and a first automobile response. This automobile response corresponds to at least one of the first driver command and/or the second driver command. The second data collection unit is configured to collect the first data indicative of the first driver command, the third data indicative of a third driver command, and a second automobile response. This second automobile response corresponds to at least one of the first driver command and/or the third driver command. The subjective monitoring device is configured to capture subjective monitoring data and is in electronic communication with at least one of the first data collection unit and/or the second data collection unit. The first data, the second data and/or the third data may be time associated with the subjective monitoring data. In these embodiments, the subjective monitoring device is a video capture device (e.g., a still camera, a video camera, or a lens).

In various exemplary driver response information collection systems, the first data is indicative of acceleration. The first data may be indicative of acceleration and the second data may be indicative of a force created by the acceleration or caused by another driver command. In these embodiments, the third data may be a steering component input from a driver. Moreover, in various embodiments, the driver response information collection system is any system configured to collect data corresponding to an automobile response from a driver command.

In exemplary embodiments, the systems described herein may be configured to perform methods for establishing drivability evaluation targets. In these embodiments, an automobile configured with the drivability evaluation system is provided. The automobile comprises an automobile control and a sensor. The drivability evaluation system comprises a subjective data monitoring device, a first data collection unit and a second data collection unit. The automobile receives commands from the driver at the automobile control, such that the command causes the automobile to perform an operating event. This operating event may include, for example, acceleration, stopping, maneuvering, or any other suitable operating event. The sensor detects the first data indicative of the operating event. The subjective data monitoring device detects the second data in response to the operating event. The subjective data monitoring system is configured to capture the subjective data. The first data collection unit receives, captures, and/or analyzes the first data indicative of the operating event from the sensor. The second data collection unit also receives, captures, and/or analyzes the first data indicative of the operating event from the sensor and receives, captures, and/or analyzes the subjective data from the subjective data monitoring device, wherein the subjective data is correlated to the first data indicative of the operating event. The first data and the subjective data may then be correlated and analyzed. The analysis is used to establish one or more drivability evaluation targets based on the correlated subjective data and the first data. This correlation and analysis allows a user to adjust the automobile control based on the drivability evaluation target to modify one or more operating parameters of the automobile.

BRIEF DESCRIPTION OF THE DRAWINGS

The features, obstacles, and advantages of the present invention will become more readily apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

In various exemplary embodiments, a drivability evaluation system may be any system configured to correlate subjective driver response to objective automobile performance. More specifically, the drivability evaluation system may be configured to capture or sense subjective driver responses, monitor driver commands and monitor automobile performance based on the driver commands. Moreover, the drivability evaluation system may be employed in real world driving scenarios, where driver commands and the associated automobile responses are indicative of actual every day driving.

In various embodiments, the drivability evaluation system comprises one or more sensors, an electronic control unit ("ECU"), a driver monitoring device and a performance data monitoring unit. The sensors may be in electronic communication (e.g., wired or wireless) with the ECU and/or the performance data monitoring unit. Similarly, the driver monitoring device may be in electronic communication with the ECU and/or the performance data monitoring unit. The drivability evaluation system may be installed at any suitable location in any automobile. For example, the drivability evaluation system may be installed in the dashboard or behind the controls on the dashboard. Moreover, the drivability evaluation system may comprise or be configured to interface with various existing automobile components and/or systems, including, for example, an automobile steering system, an automobile ECU, automobile sensors, and/or the like.

Figure 1A:
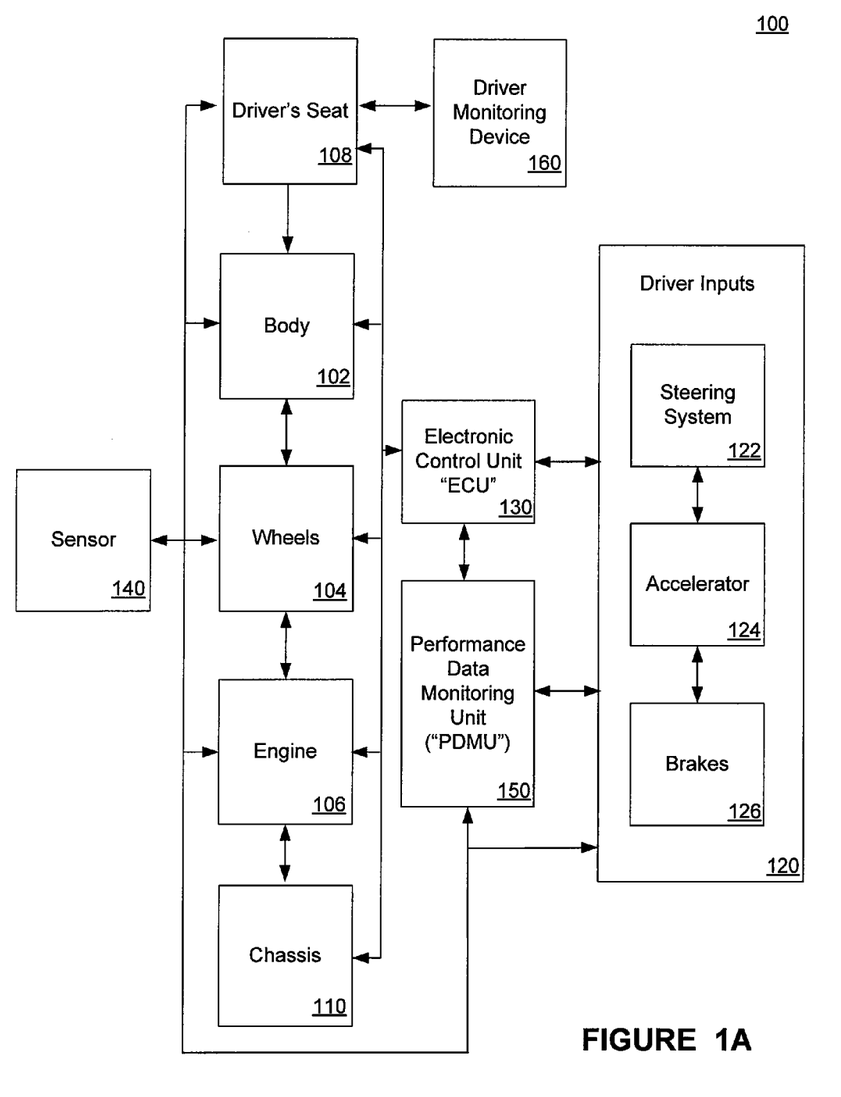
FIG. 1A is a box diagram of an automobile including an engine and components of a drivability evaluation system in accordance with an exemplary embodiment.
Figure 1B:
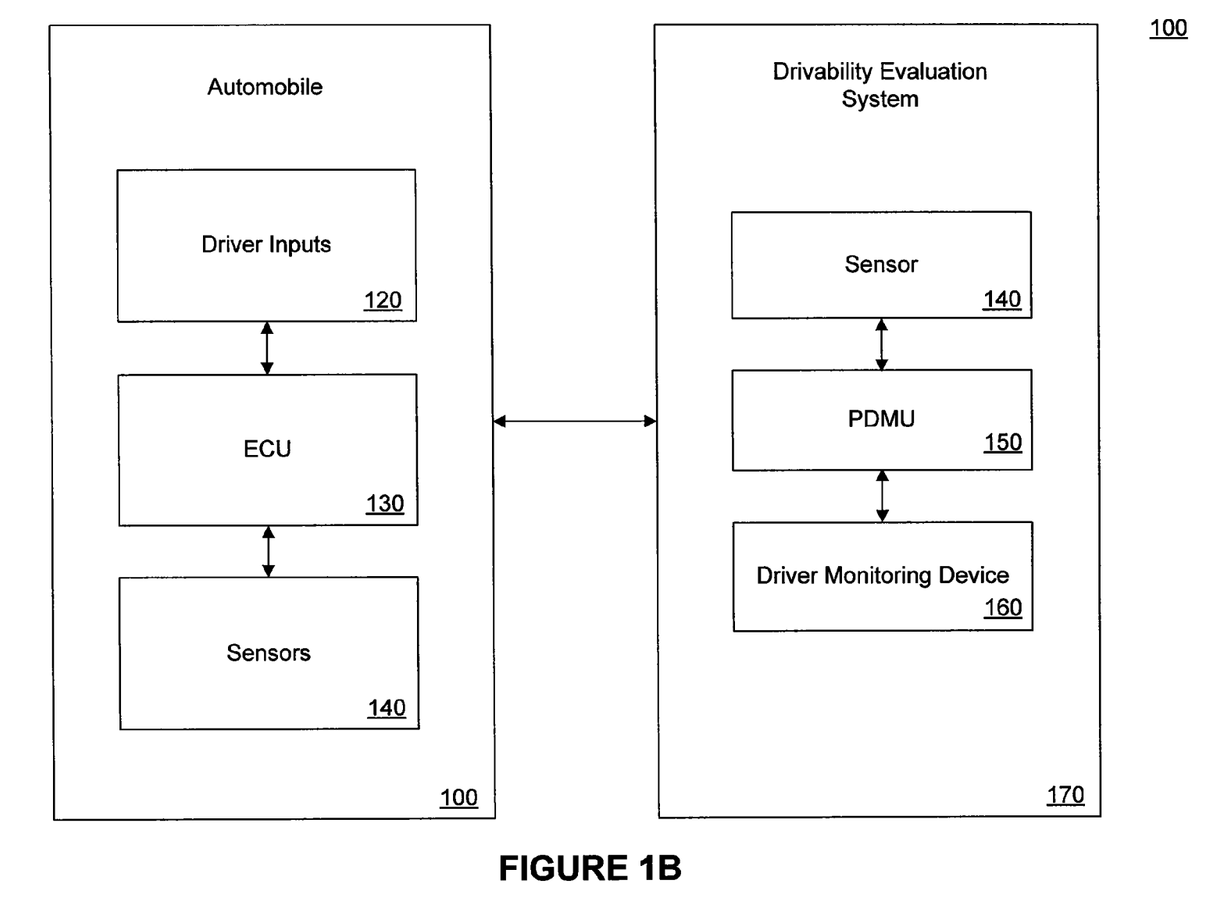
FIG. 1B is a box diagram of an automobile coupled to or comprising a drivability evaluation system in accordance with an embodiment.

In an exemplary embodiment and with reference to FIG. 1A and FIG. 1B, an automobile 100 generally comprises a body 102, wheels 104, an engine 106, a driver's seat 108, a chassis 110, an automobile control system 120, and/or an ECU 130. The automobile 100 may also comprise and/or be configured with a drivability evaluation system 170 and one or more sensors 140. In these embodiments, the body 102 mounts and couples to the chassis 110. The chassis 110 rotatably couples to the wheels 104. The engine 106 mounts to and is supported by the chassis 110 and is at least partially enclosed by the body 102. The automobile control system 120 provides inputs to the wheels 104 and the engine 106 and/or the ECU 130. The ECU 130 is in electronic communication with the engine installed at any suitable location within the automobile 100. The drivability evaluation system 170 comprises and/or is in electronic communication with the ECU 130 and may be installed at one or more suitable locations on the automobile 100. One or more sensors 140 may be installed at any suitable position(s) on the automobile 100 and may electronically communicate with the ECU 130 and/or the drivability evaluation system 170.

The engine 106 primarily drives the wheels 104. The engine 106 may be any suitable motor configured to consume fuel, energy and/or electricity and output power such as, for example, an internal combustion engine, an electric motor, a hybrid internal combustion engine-electric motor, or any other suitable power generation system, which is suitable to move the automobile 100. The automobile control system 120 may comprise a steering system 122, an accelerator 124, and brakes 126 (or a brake system 126). The automobile control system 120 receives inputs from a driver through the steering system 122, the accelerator 124, and/or the brakes 126 and communicates those inputs to the wheels 104, the engine 106, and/or the ECU 130.

The drivability evaluation system 170 may be any system suitably configured to monitor driver inputs and automobile performance. The drivability evaluation system 170 is configured to collect objective data indicative of an automobile's performance in response to a driver's input. The drivability evaluation system 170 is also configured to collect subjective data. The subjective data may be any expression, description, comment, observation, reaction, video data, and/or audio data from the driver to a particular performance characteristic of the automobile 100. The drivability evaluation system 170 is also configured to correlate the subjective and objective data. This correlation illustrates a driver's reaction or impression to operating parameters of an automobile based on the driver's input. Put another way, the drivability evaluation system 170 allows a user to analyze and determine whether the driver perceived an expected automobile performance result based on the driver's input.

For example, the driver may provide an input to the automobile's accelerator and may also react to the response of the automobile as a result of the input at the accelerator. In this example, the drivability evaluation system 170 collects data associated with the input, including, for example, gas pedal position, acceleration, force created by the acceleration, and any subjective data provided by the driver. The driver may describe the acceleration as "hard" or "sluggish." This subjective data can then be evaluated in light of the objective data collected by the drivability evaluation system 170. The evaluation allows a user to understand what specific inputs (e.g., gas pedal position, acceleration, force created by the acceleration, etc.) the driver associated "hard" or "sluggish." This data also allows a user to adjust the automobile controls to achieve a desired result.

In various embodiments, the drivability evaluation system 170 comprises or is configured to communicate with the automobile control system 120, the ECU 130, the sensors 140, a performance data monitoring unit ("PDMU") 150 and/or a driver monitoring device 160. In various embodiments, the automobile control system 120 is configured to receive inputs and/or commands from a driver that causes an automobile to accelerate, stop, and/or maneuver. These inputs and/or commands are communicated to the ECU 130 and/or the PDMU 150. The sensors 140 monitor the automobile's response to the commands (e.g., the acceleration, stopping, or maneuvering) and communicate data indicative of the automobile's responses to the ECU 130 and/or the PDMU 150. The driver monitoring device 160 may also be configured to provide data to the PDMU 150 or another suitable data collection device, such that the data captured by the driver monitoring device 160 is correlated to the data provided by the sensors 140. This correlation allows the user to understand the driver's subjective perception of automobile's performance in response to a driver's command.

In exemplary embodiments, the automobile control system 120 is any suitable automobile control inputs to receive driver commands. The automobile control system 120 generally receives driver commands that dictate the performance of the automobile 100. For example, the automobile control system 120 includes the steering system 122, the accelerator 124 and the brakes 126. The steering system 122 may include a steering wheel, linkages, electrical connections, transfer mechanisms, sensors, and other suitable devices or assemblies. The accelerator 124 may include an accelerator pedal, linkages, electrical connections, transfer mechanisms, sensors, and other suitable devices or assemblies. The brakes 126 (or brake system 126) may include a brake pedal, linkages, calipers, brake shoes, electrical connections, transfer mechanisms, sensors, and other suitable devices or assemblies. The automobile control system 120 may also include a traction control system, manual transmission, or any other suitable driver input.

In these embodiments, the steering system 122 couples to and conducts driver inputs from the steering wheel to the wheels 104. In this way, the steering system 122 is generally configured to control the maneuverability of the automobile 100. The accelerator 124 couples to and conducts driver inputs to the engine 106 through a throttle bottle, electronic fuel control, or other suitable mechanism. In this way, the accelerator 124 controls the speed and/or acceleration of the automobile 100. The brakes 126 couple to and conduct driver inputs to the wheels 104 with calipers and brake shoes or other suitable mechanisms. In this way, the brakes 126 control the speed, stopping ability, and maneuverability of the automobile 100.

In various embodiments, the ECU 130 may be any suitable device, mechanism, system, hardware, and/or hardware-software structure configured to control the automobile 100. The ECU 130 couples to, monitors, and receives automobile operation data and/or driver commands from the automobile control system 120. The ECU 130 also couples to, monitors, and receives automobile operational data from the wheels 104, the engine 106, and/or one or more sensors 140. Moreover, the ECU 130 may be configured with various algorithms, processes, software, and/or control schemes to manage and or adjust various components of the automobile 100. In these embodiments, the ECU 130 may also provide data to a data collection device that is configured to capture commands at driver inputs, automobile operational parameters, or any other suitable data related to the automobile 100.

In exemplary embodiments, one or more sensors 140 are installed at various suitable locations in the automobile 100. The sensors 140 may be any suitable sensor configured to monitor, detect, capture, observe, analyze, transmit and/or record data. One or more sensors 140 may include, for example, a speed sensor, a force sensor such as an accelerometer, a position sensor or any other suitable sensor. In these embodiments, one or more sensors 140 are configured to capture and transmit data associated with a performance event of the automobile 100. One or more sensors 140 are also configured to capture and transmit data associated with the effect of a performance event of the automobile 100 on a driver. The sensors 140 are configured to capture, transmit, and/or electronically communicate data to one or more data collection devices, including, for example, the ECU 130, the PDMU 150, a first data collection device, a second data collection device, or any other suitable data collection device. In various embodiments, the first data collection device and/or the second data collection device may be the ECU 130, the PDMU 150 and/or any other suitable data collection device.

In various exemplary embodiments, the PDMU 150 is installed at any suitable location in the automobile 100. In these embodiments, the PDMU 150 is any suitable data collection device configured to monitor, record, analyze, and/or correlate objective automobile performance data and subjective data associated with a driver. The PDMU 150 may be configured to monitor, record, analyze and/or correlate data from one or more sensors 140. The PDMU 150 may also be configured to monitor, record, analyze and/or correlate data from the driver monitoring device 160. In these embodiments, the PDMU 150 may be configured with various algorithms, processes, software, and/or control schemes to manage, capture, monitor, record, analyze, and/or otherwise process data from various components of the automobile 100.

In exemplary embodiments, the driver monitoring device 160 is any suitable device configured to capture subjective data from a driver. For example, the driver monitoring device 160 may be a camera, lens, video recorder, microphone or other suitable data capture mechanism. In these embodiments, the driver monitoring device 160 may be installed at any suitable location, such as, for example, on the dash board of the automobile 100. The driver monitoring device 160 may also be installed at any other suitable location, such that, the driver monitoring device 160 can capture the subjective data provided by the driver.

Figure 2A:
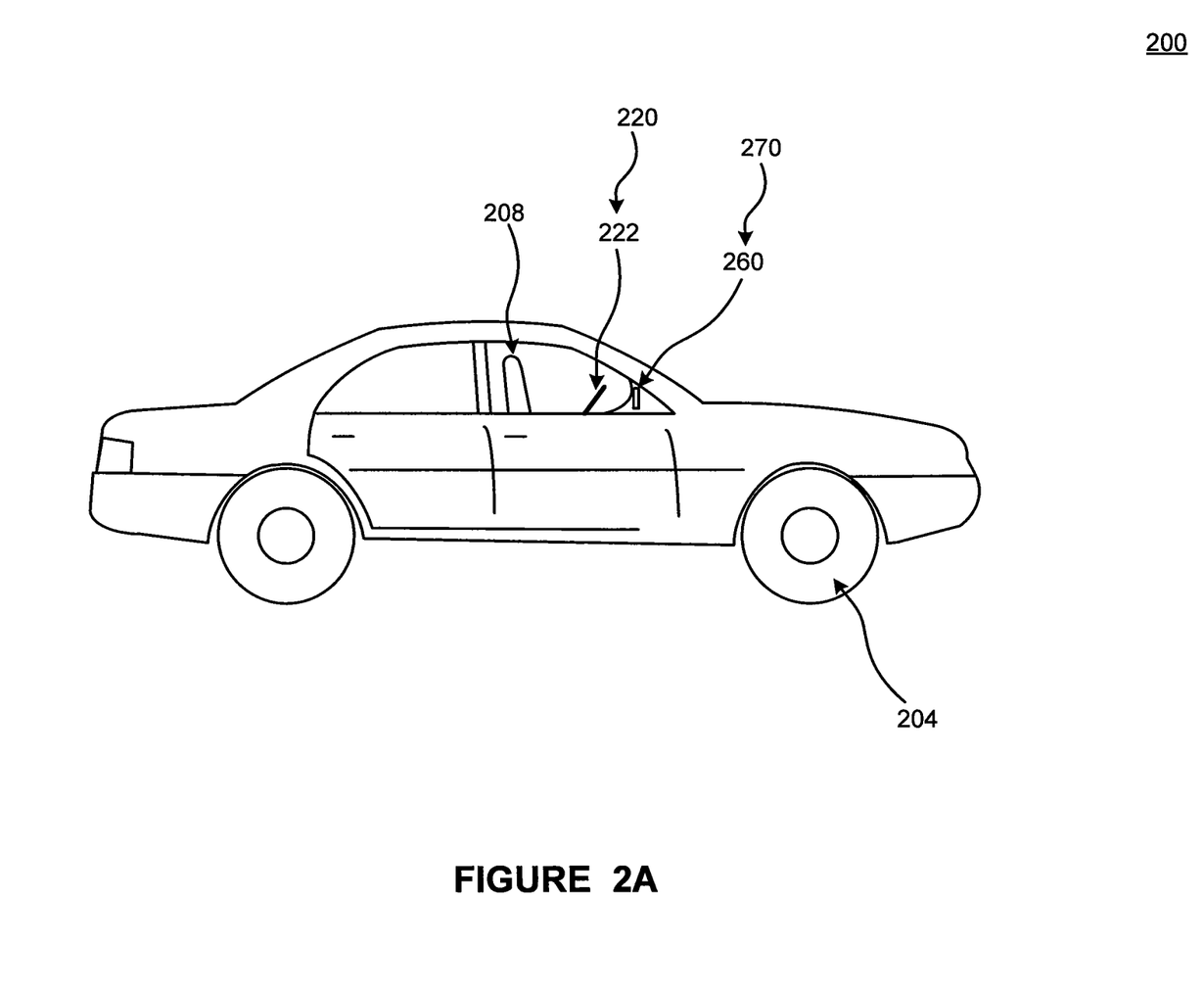
FIG. 2A illustrates a side view of an automobile configured with a drivability evaluation system in accordance with an embodiment.
Figure 2B:
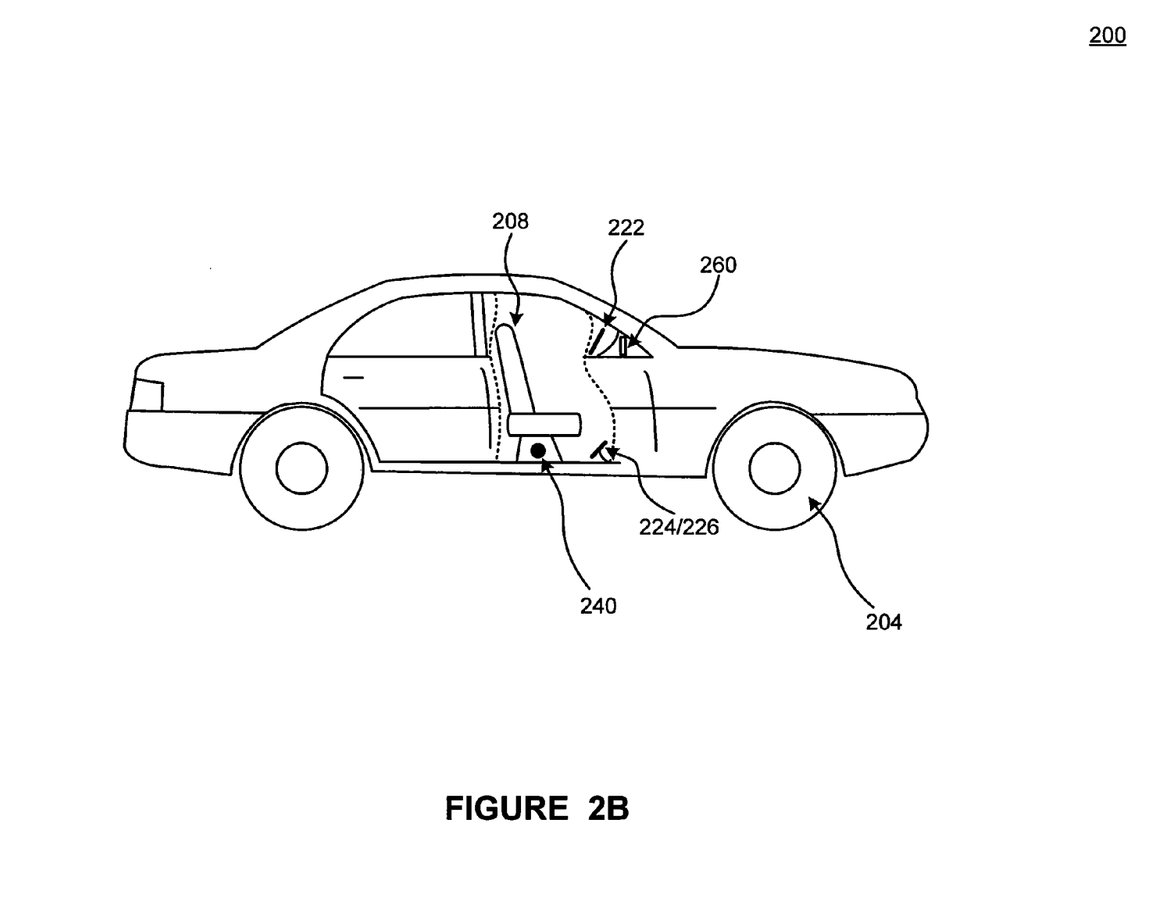
FIG. 2B illustrates a side view of an automobile with a door removed to show a drivability evaluation system in accordance with an embodiment.
Figure 2C:
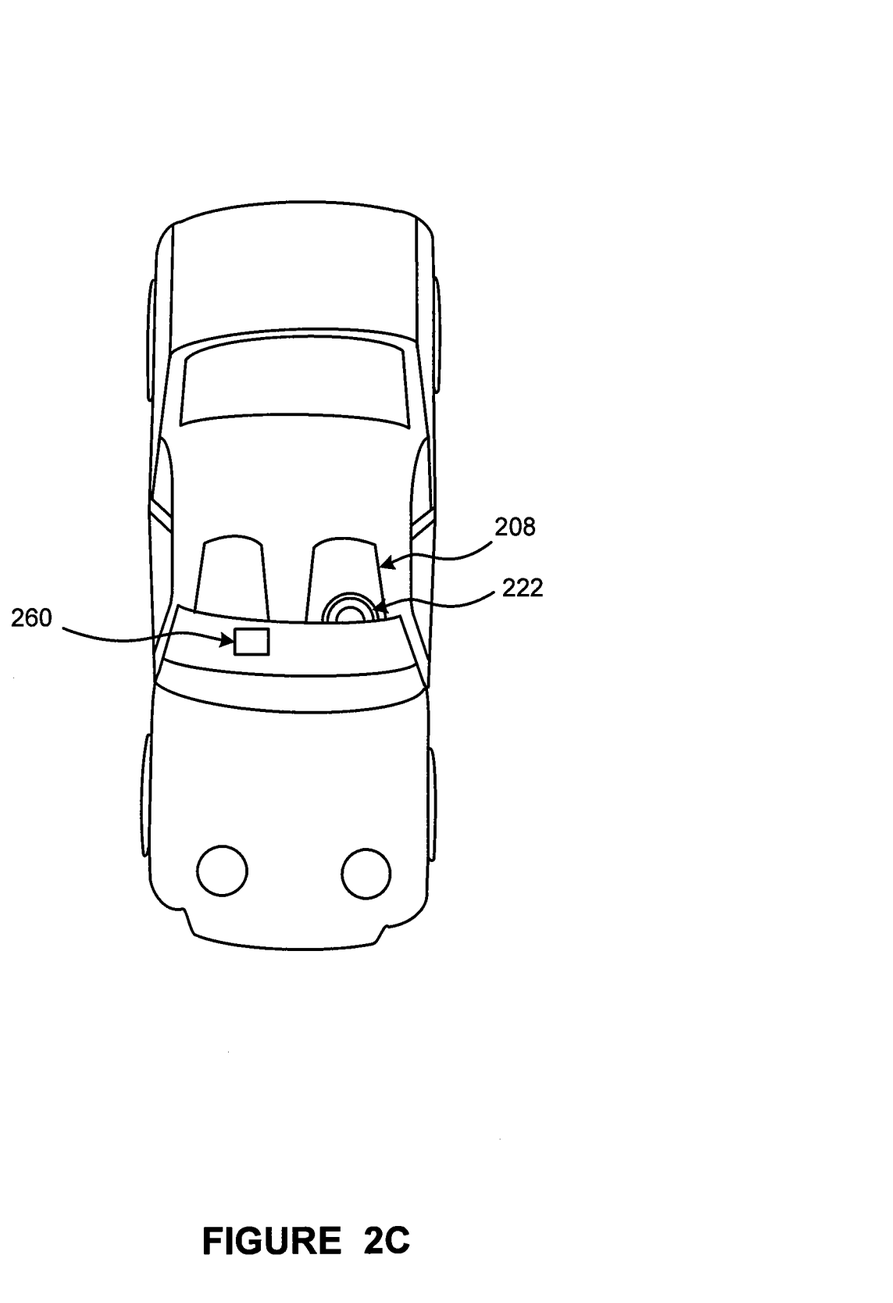
FIG. 2C illustrates a top view of an automobile configured with a drivability evaluation system in accordance with an embodiment.

In various exemplary embodiments, and with reference to FIG. 2A, FIG. 2B and FIG. 2C, an automobile 200 may be any suitable automobile configured with a drivability evaluation system 270. The drivability evaluation system 270 is configured to monitor, record, and/or analyze a driver's driving patterns and associated automobile responses, and driver responses or subjective perception of the automobile operation.

In operation, the automobile 200 configured with the drivability evaluation system 270 is used to establish drivability targets based on data collected from drivers operating automobile 200 under real world or nearly real world conditions. A driver or group of drivers is selected from a pool of current automobile owners or potential purchasers of a particular brand, class, and/or type of automobile. A predetermined road course is selected. The road course may be selected to evaluate a particular automobile performance parameter or simulate typical driving conditions experienced by the selected drivers. For example, the road course may comprise hills, turns, portions that require stopping, starting, and/or rapid acceleration, and/or any other suitable conditions.

As the driver drives the road course, the driver provides inputs through driver inputs (e.g., steering system 222, accelerator 224, brakes 226, and/or the like) causing automobile performance events. During these events, the driver is monitored by the driver monitoring device 260 to capture subjective data. Also, during the events and/or over the entire road course, the sensors 240 monitor the objective performance data of the automobile 200 (e.g., speed, acceleration, force, wheel 204 position, steering wheel 222 position, accelerator 224 position, and/or the like). The sensors 240 may also be installed to monitor conditions experienced by the driver.

For example, one or more sensors 240 may be operatively coupled to a driver's seat 208. Where the sensor 240 is an accelerometer, force on the driver's seat 208 and/or the driver is evaluated during the automobile performance events as objective data. The driver's expression or comments in response to the force are also recorded by the driver monitoring device as subjective data. The objective data may be captured in any suitable fashion, such as, with a PDMU 150, an ECU 130, or with one or more data collection devices. The subjective data may also be captured in any suitable fashion, such as, with a PDMU 150, an ECU 130, or one or more data collection devices.

In another example, the driver may move the accelerator 224 from 0% to 30%. This driver command may be recorded by the one or more sensors 240, such as a pedal position sensor or may be captured by the ECU 130. The accelerator 224 movement may produce 0.3 g of force after a time delay of 0.5 seconds. This data may also be captured as objective data by the one or more sensors 240 and/or the ECU 130. In response to this automobile performance event, the driver may provide subjective feedback that is captured by the driver monitoring device 270. For example, the driver may say "that feels good—it is responsive" or "the delay is unacceptable—it feels sluggish." Based on the subjective feedback from the driver, a user is able to understand what objective inputs and associated responses are acceptable or unacceptable to drivers.

In these embodiments, the objective data may be recorded on a first data collection device and the subjective data may be recorded on a second data collection device. Where the objective data and the subjective data are recorded on different data collection devices, each of the data collection devices may be configured to collect a piece of correlating data. For example, each of the first data collection device and the second data collection device may be configured to record the speed of the automobile 200 over the road course. This correlating data allows the objective data and the subjective data to be combined and/or associated for analysis. More specifically, this correlating data insures that the subjective data and the objective data associated with a particular performance event can be easily associated for analysis. This correlation allows a user to quantify the subjective response of the driver and adjust the automobile control system 220 to refine the performance response of the automobile 200 when the automobile 200 receive a particular driver command.

In exemplary embodiments, a user (e.g., a passenger) may accompany the driver during the road course. The user may operate the drivability evaluation system 270. The user may also solicit subjective feedback from the driver as the automobile moves through the road course. This insures that the subjective data is sufficiently descriptive and/or meaningful for later analysis with the objective automobile performance data.

Figure 3:
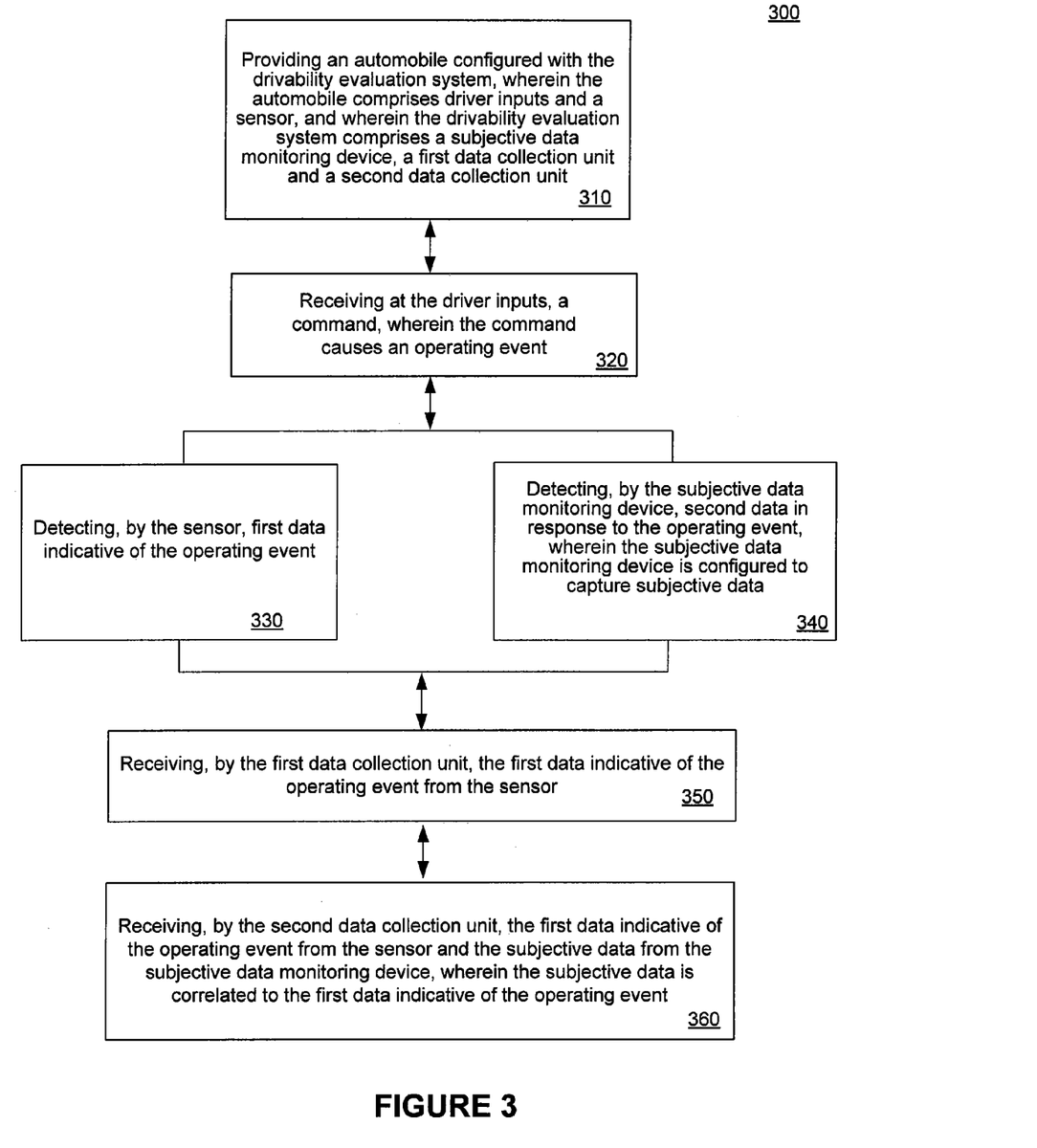
FIG. 3 is a box diagram of a data capture process of a drivability evaluation system in accordance with an exemplary embodiment.

In exemplary embodiments and with reference to FIG. 3, a method for establishing drivability evaluation targets is provided. In these embodiments an automobile configured with the drivability evaluation system is provided (Step 310). The automobile comprises driver inputs and a sensor. The drivability evaluation system comprises a subjective data monitoring device, a first data collection unit and a second data collection unit (Step 310). The first data collection unit and the second data collection unit can each include a memory or be coupled to a common memory for recording and/or storing the first data and the second data. The automobile receives one or more commands from the driver at the automobile control, such that the one or more commands cause the automobile to perform an operating event (Step 320). This operating event may include, for example, acceleration, stopping, maneuvering, or any other suitable operating event. The sensor detects first data indicative of the operating event (Step 330). The subjective data monitoring device detects the second data in response to the operating event (Step 340). The subjective data monitoring system is configured to capture the subjective data. The first data collection unit receives, captures, and/or analyzes the first data indicative of the operating event from the sensor (Step 350). The second data collection unit also receives, captures, and/or analyzes the first data indicative of the operating event from the sensor and receives, captures, and/or analyzes subjective data from the subjective data monitoring device, wherein the subjective data is correlated to the first data indicative of the operating event (Step 360). The first data and the subjective data may then be correlated and analyzed. The analysis is used to establish one or more drivability evaluation targets based on the correlated subjective data and the first data. This correlation and analysis allows a user to adjust an automobile control based on the drivability evaluation target to modify one or more operating parameters of the automobile based on the driver inputs.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Thus, the automobile described herein employ a drivability evaluation system to monitor, record and correlate objective data associated with automobile performance and subjective data associated with a driver's perception of automobile performance, allowing a user to refine automobile performance based on the correlated data.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile, comprising:
   a plurality of automobile controls including a steering mechanism, an accelerator and a brake, at least one of the plurality of automobile controls configured to receive a driver command,
   a plurality of wheels controllable by the steering mechanism;
   an engine configured to drive at least one of the plurality of wheels;
   a control unit in communication with the engine and the plurality of automobile controls, wherein the control unit is configured to manage the operation of the automobile based on the received driver command;
   a sensor configured to detect a response of the automobile to the received driver command;
   a first data collection unit configured to receive objective data indicative of a performance of the automobile in response to the received driver command and correlating data indicative of an operational parameter of the automobile from the control unit or the sensor; and
   a second data collection unit configured to receive subjective driver data indicative of the performance of the automobile in response to the received driver command and the correlating data from the control unit or the sensor.

2. The automobile of claim 1, wherein the objective data includes data corresponding to a first automobile control.

3. The automobile of claim 2, wherein the objective data includes data corresponding to a first operational characteristic of the automobile and the data corresponding to the first automobile control.

4. The automobile of claim 3, wherein the objective data and the subjective driver data are combined based on the correlating data such that the objective data and the subjective driver data are correlated.

5. The automobile of claim 4, wherein the first automobile control is acceleration.

6. The automobile of claim 1, further comprising a subjective driver monitoring device.

7. The, automobile of claim 6, wherein the subjective driver monitoring device is configured to record, as the subjective driver data, a subjective response of a driver in response to the response of the automobile to the received driver command.

8. The automobile of claim 7, wherein the received driver command is an input at the accelerator.

9. The automobile of claim 6, wherein the subjective driver monitoring device records the subjective driver data during an entire automobile evaluation.

10. The automobile of claim 9, wherein the subjective driver monitoring device records the subjective driver data during a driving test conducted by a driver over a predetermined course.

11. The automobile of claim 10, wherein the correlating data comprises common data that is correlated with the objective data and the subjective driver data.

12. The automobile of claim 11, wherein the common data provides a baseline for analysis of each of the objective data and the subjective driver data.

13. A driver response information collection system, comprising:
   a first data collection unit configured to collect first data indicative of a first driver command, second data indicative of a second driver command, correlating data indicative of an operational parameter of the automobile, and a first automobile response, wherein the first automobile response corresponds to the first driver command or the second driver command;
   a second data collection unit configured to collect the first data indicative of the first driver command, third data indicative of a third driver command, the correlating data, and a second automobile response, wherein the second automobile response corresponds to the first driver command or the third driver command; and
   a subjective monitoring device configured to capture subjective monitoring data and send the subjective monitoring data to the first data collection unit or the second data collection unit, wherein at least one of the first data, the second data or the third data is associated with the subjective monitoring data through the correlating data.

14. The driver response information collection system of claim 13, wherein the subjective monitoring device is a video capture device.

15. The driver response information collection system of claim 13, wherein the first data is indicative of acceleration.

16. The driver response information collection system of claim 13, wherein the first data is indicative of acceleration and the second data is indicative of force.

17. The driver response information collection system of claim 13, wherein the first data collection unit or the second data collection unit is further configured to collect data corresponding to an automobile response from at least one of the first driver command, the second driver command and the third driver command.

18. The driver response information collection system of claim 13, wherein the third data is a steering component input from a driver.

19. A method for establishing drivability evaluation targets, comprising:
providing an automobile configured with a drivability evaluation system, wherein the automobile comprises an automobile control and a sensor, and wherein the drivability evaluation system comprises a subjective data monitoring device, a first data collection unit and a second data collection unit;
receiving at the automobile control a driver command, wherein the driver command causes an operating event;
detecting, by the sensor, objective data indicative of the operating event;
detecting, by the subjective data monitoring device, subjective driver data in response to the operating event;
receiving, by the first data collection unit, the objective data indicative of the operating event from the sensor and correlating data from the automobile control or the sensor; and
receiving, by the second data collection unit, the subjective driver data from the subjective data monitoring device and the correlating data, wherein the subjective driver data is correlated to the objective data indicative of the operating event based on the correlating data.

20. The method of claim 19, further comprising determining a drivability evaluation target based on the correlated subjective driver data and the objective data, wherein a user adjusts the automobile control based on the drivability evaluation target.

* * * * *